Figure 1:
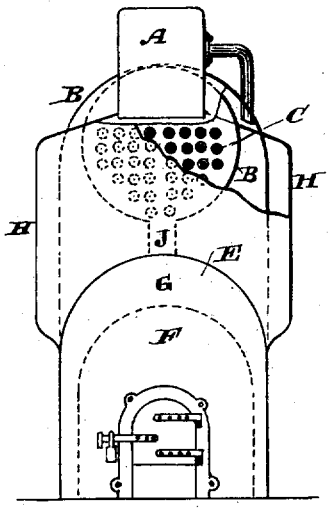

2 Sheets—Sheet 1.

P. F. DUNDON.

STEAM BOILER.

No. 10,758. Reissued Aug. 17, 1886.

Witnesses,
Geo. H. Strong.
J. P. Norris.

Inventor,
P. F. Dundon
By
Dewey & Co.
Attys

N. PETERS, Photo-Lithographer, Washington, D.C.

2 Sheets—Sheet 2.

P. F. DUNDON.

STEAM BOILER.

No. 10,758. Reissued Aug. 17, 1886.

Witnesses,
Geo. H. Strong.
J. R. Souse

Inventor,
P. F. Dundon
By
Dewey & Co.
Attys

N. PETERS, Photo-Lithographer, Washington, D. C.

UNITED STATES PATENT OFFICE.

PATRICK F. DUNDON, OF SAN FRANCISCO, CALIFORNIA.

STEAM-BOILER.

SPECIFICATION forming part of Reissued Letters Patent No. 10,758, dated August 17, 1886.

Original No. 298,561, dated May 13, 1884. Application for reissue filed March 26, 1886. Serial No. 196,739.

*To all whom it may concern:*

Be it known that I, PATRICK F. DUNDON, of the city and county of San Francisco, State of California, have invented an Improvement in Steam-Boilers; and I hereby declare the following to be a full, clear, and exact description of the same.

My invention relates to that class of steam-boilers generally known as "horizontal return-flue boilers" or "steam-generators;" and it has for its object to overcome certain defects in that class of boilers as heretofore constructed. This type of boilers as at present mostly used has its furnaces, lower flues, combustion-chamber, return-flues, and the steam-space above the return-flues, all inclosed in one cylindrical shell, the flames and products of combustion passing from the furnace through the lower flues into the combustion-chamber, and back through return-flues to the chimney or smoke-stack at the front of the boiler, and it follows that when it is desired to construct a boiler of this peculiar type with two or more furnaces it becomes necessary to make the cylindrical shell very large, in doing which it also becomes necessary to build it of very thick or heavy plates, in order to enable it to safely carry a high steam-pressure; but with the use of extra heavy plates the expansion and contraction become proportionately greater, and the lower parts of the boiler, where the largest body of water is contained, as well as all the outside surfaces of the boiler which are not in contact with the heat of the flames, will remain comparatively cold and rigid, while the upper portion of the boiler, through which the flames and products of combustion pass, (internally,) become heated and expanded, thereby unduly straining the boiler each time that steam is generated in it, and by this uneven expansion and contraction very materially reducing its strength and durability.

The object of my improvement is to overcome these serious defects by the novel and peculiar construction and combination of parts of my boiler, in which the furnaces are contained in one shell or casing and the return-flues in a separate cylindrical shell, whereby I obviate the necessity of having a very large shell and extra heavy plates, and after the flame and products of combustion return to the front end of the boiler they are again returned under and around the outside of the boiler, thereby entirely overcoming and entirely doing away with the unequal expansion and its destructive results, all parts of the boiler being brought in contact with the flames and products of combustion, and evenly heated thereby, whereby I also economize fuel to the greatest possible extent.

Figure 2:
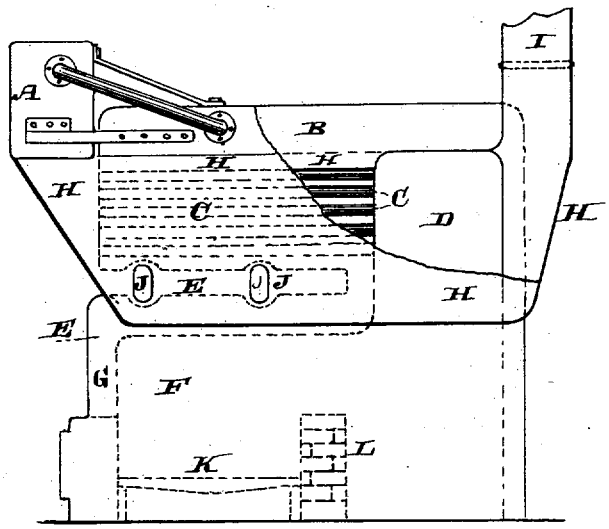
Figure 3:
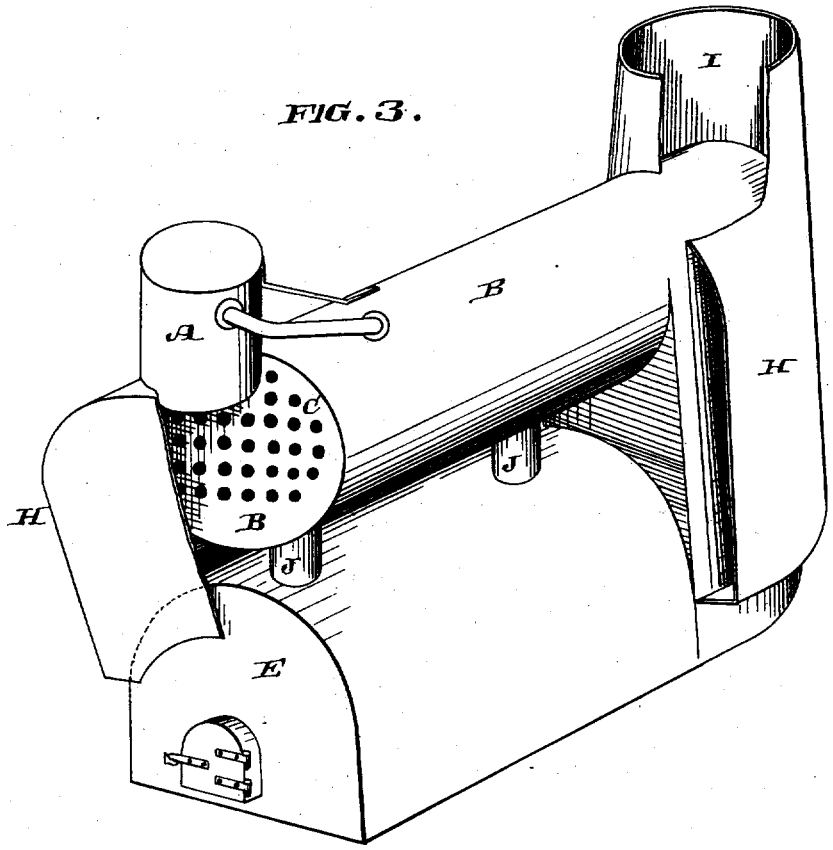

In the accompanying drawings, Figure 1 represents a front elevation of my improved steam-boiler, partly in section. Fig. 2 is a side elevation of the same with the exterior shell or casing broken away to show the interior construction and arrangement, similar letters of reference indicating corresponding parts in both the figures.

A denotes the steam-drum or superheater, and B the upper or return-flue shell of the boiler.

C are the return-flues, through which the products of combustion return to the front end of the boiler from the combustion-chamber D.

E is the lower shell.

F is the furnace.

L is the bridge-wall.

G is the water-space between the furnace and its surrounding shell E.

K are the grate-bars.

H is the flame-jacket, which extends around the front end of the upper shell, and there forms a combustion-chamber, H′, to receive the flames and products of combustion which pass through the return-flues C, and are from there conveyed to the rear end of the boiler and to the chimney or smoke-stack I. This jacket H is attached to the sides of the upper shell, B, and also to the sides of the lower shell, E, as well as to that part of the boiler forming the shell which surrounds the combustion-chamber D; and it follows that the flames and products of combustion, in returning from the front of the upper shell, B, to the chimney I, will pass under and around said upper shell and over and around the lower shell, E, and also around the outside shell of the combustion-chamber D before they reach the chimney I.

J J are pipes which form openings from the lower to the upper shell, so that a free circulation of water may exist, and so that the steam generated in the lower shell, E, which surrounds the furnaces and combustion-chamber, may freely make its way up into the steam-space in the upper shell, B, through said openings J, as well as through the space between the combustion-chamber and its surrounding shell. The furnace F and its surrounding shell E should be properly stayed to one another, and the combustion-chamber D and that part of the boiler surrounding it are also to be properly stayed together to give them the required degree of strength and durability. The boiler should also be provided with suitably-located man-holes and hand-holes for cleaning and repairing purposes, and the jacket H should be similarly provided with doors by means of which it may be cleaned whenever required.

It is obvious that this boiler may be constructed with any number of furnaces and a corresponding number of upper and lower shells, all to open into a common combustion-chamber, or a separate combustion-chamber for each set of shells and furnaces, if desired; or it may be constructed with furnaces and their respective upper and lower shells at both ends, and a combustion chamber or chambers located between them, in substantially the same manner as described for a single boiler. The furnaces and their surrounding shells may be circular, with the furnaces placed eccentric to the outside shell, so as to leave a large water-space over the fire and a small water-space under the bottom of the furnace, and where this construction is adopted there will be no need of the bridge-wall L; or the furnace and its surrounding shell may be constructed to form side legs, as represented in that form of my improvement which I have illustrated on the drawings.

Having thus described my invention, what I claim as new, and desire to secure by Letters Patent, is—

1. A boiler composed of two separate and independent shells, one of which constitutes the furnace and has suitable grate-bars and a passage extending to the rear with flues contained in the other shell and in connection with the furnace by a passage at the rear, said flues being adapted to return the heat from the rear to the front of the boiler, substantially as described.

2. The boiler composed of two independent shells, one of which has the furnace and passages for conveying the heat to the rear of the boiler, and the other has flues through which the heat is returned to the front, in combination with a surrounding jacket forming a passage through which the heat may again be conveyed outside of the boiler, substantially as herein described.

3. A boiler composed of two horizontal shells placed one above the other and having a vertical connecting-passage of large diameter at one end, a furnace situated within the lower shell surrounded by water therein, a combustion-chamber extending upward through the rear connecting-passage, surrounded by the water therein, return-flues connecting said combustion-chamber with the front of the upper boiler-shell, and a flame jacket or chamber connecting with this space and surrounding the boiler-shells below the water-line, said jacket connecting with the smoke-stack, substantially as herein described.

4. Shells placed one above the other, the lower shell having a water-space surrounding the furnace, which is located therein and communicates with the combustion-chamber at the rear, the upper shell having return-flues, as shown, in combination with a surrounding flame-jacket attached to the shell, substantially as herein described.

5. In a boiler, a lower shell having a water-space surrounding a furnace wholly or in part, said furnace communicating with the combustion-chamber, as shown, an upper shell having return-flues also communicating with said combustion-chamber, and a surrounding flame-jacket attached to the shell, in combination with pipes or openings connecting the upper and lower shells, substantially as herein described.

In witness whereof I have hereunto set my hand.

PATRICK F. DUNDON.

Witnesses:
JOHN E. HAMILL,
M. A. DONNELLY.